US012764768B2

(12) United States Patent
Peng et al.

(10) Patent No.: US 12,764,768 B2
(45) Date of Patent: Oct. 13, 2026

(54) SIDELINK COMMUNICATION METHOD AND DEVICE

(71) Applicant: Huawei Technologies Co., Ltd., Shenzhen (CN)

(72) Inventors: Wenjie Peng, Shanghai (CN); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 349 days.

(21) Appl. No.: 18/417,711

(22) Filed: Jan. 19, 2024

(65) Prior Publication Data

US 2024/0155655 A1 May 9, 2024

Related U.S. Application Data

(63) Continuation of application No. PCT/CN2022/107553, filed on Jul. 25, 2022.

(30) Foreign Application Priority Data

Jul. 23, 2021 (CN) ......................... 202110837854.5
Feb. 14, 2022 (CN) ......................... 202210132001.6

(51) Int. Cl.
*H04W 72/40* (2023.01)
*H04W 8/00* (2009.01)
(Continued)

(52) U.S. Cl.
CPC ........... *H04W 72/40* (2023.01); *H04W 8/005* (2013.01); *H04W 48/18* (2013.01); *H04W 72/02* (2013.01); *H04W 72/232* (2023.01)

(58) Field of Classification Search
CPC ..... H04W 72/40; H04W 8/005; H04W 48/18; H04W 72/02; H04W 72/232
See application file for complete search history.

(56) References Cited

U.S. PATENT DOCUMENTS

2007/0121636 A1* 5/2007 Kim ......................... H04L 65/80 370/468
2017/0325214 A1* 11/2017 Lu ........................... H04W 4/70
(Continued)

FOREIGN PATENT DOCUMENTS

CN 105589506 A 5/2016
CN 107852727 A 3/2018
(Continued)

OTHER PUBLICATIONS

3GPP TS 38.321 V16.5.0 (Jun. 2021), "3rd Generation Partnership Project, Technical Specification Group Radio Access Network, NR, Medium Access Control (MAC) protocol specification", total 156 pages.
(Continued)

*Primary Examiner* — Mohammad S Anwar
(74) *Attorney, Agent, or Firm* — Slater Matsil, LLP

(57) ABSTRACT

Embodiments of this application provide a sidelink communication method and device. The method includes: A communication device obtains configuration information and a transmission resource. The configuration information includes configuration of a first resource pool and configuration of a second resource pool. According to the method, it can be ensured that the transmission resources of the first resource pool and the second resource pool are used to send different information.

20 Claims, 6 Drawing Sheets

(51) Int. Cl.

| | |
|---|---|
| ***H04W 48/18*** | (2009.01) |
| ***H04W 72/02*** | (2009.01) |
| ***H04W 72/232*** | (2023.01) |

(56) References Cited

U.S. PATENT DOCUMENTS

| | | | | |
|---|---|---|---|---|
| 2019/0053251 | A1 | 2/2019 | Loehr et al. | |
| 2021/0051727 | A1* | 2/2021 | Lei | H04L 5/0055 |
| 2021/0058835 | A1* | 2/2021 | Luo | H04L 5/0035 |
| 2022/0060913 | A1* | 2/2022 | Zhao | H04W 72/51 |

FOREIGN PATENT DOCUMENTS

| | | | |
|---|---|---|---|
| CN | 110830952 | A | 2/2020 |
| CN | 111148074 | A | 5/2020 |
| CN | 113727300 | A | 11/2021 |
| CN | 114640963 | A | 6/2022 |
| WO | 2019160788 | A1 | 8/2019 |
| WO | 2020069295 | A1 | 4/2020 |
| WO | 2020227869 | A1 | 11/2020 |

OTHER PUBLICATIONS

3GPP TS 23.303 V16.0.0 (Jul. 2020), “3rd Generation Partnership Project, Technical Specification Group Services and System Aspects, Proximity-based services (ProSe); Stage 2 (Release 16)”, total 130 pages.

* cited by examiner

SIDELINK COMMUNICATION METHOD AND DEVICE

CROSS-REFERENCE TO RELATED APPLICATIONS

This application is a continuation of International Application No. PCT/CN2022/107553, filed on Jul. 25, 2022, which claims priority to Chinese Patent Application No. 202110837854.5, filed on Jul. 23, 2021 and Chinese Patent Application No. 202210132001.6, filed on Feb. 14, 2022. All of the aforementioned patent applications are hereby incorporated by reference in their entireties.

TECHNICAL FIELD

The present invention relates to the field of wireless communication technologies, and in particular, to a sidelink communication method and device.

BACKGROUND

With development of wireless communication technologies, a future-oriented communication system is derived, for example, a 5th generation mobile communication (5G) system or a new radio (NR) system. In the foregoing communication system, terminals may directly communicate with each other through a sidelink. A typical application scenario of sidelink communication is vehicle to everything (V2X). In the V2X, each vehicle may be understood as a terminal, and the terminals may communicate with each other through a sidelink, for example, transmit information through a direct connection, thereby effectively reducing a communication delay.

However, in the foregoing solution, when the sidelink is configured, only a general process of communication between the terminals is considered, and another possible process of communication between different terminals is not considered. Therefore, a technology needs to be provided to flexibly configure the sidelink based on different requirements, so as to cover possible scenarios of communication between different terminals.

SUMMARY

This application describes a sidelink communication method and device, to implement information transmission between terminals.

According to a first aspect, a sidelink communication method is provided. The method includes: A first communication device obtains configuration information, where the configuration information includes configuration of a first resource pool and configuration of a second resource pool, the first resource pool is used to send first information, and the second resource pool is used to send second information. The first communication device obtains a transmission resource, where the transmission resource belongs to the first resource pool or the second resource pool.

When the transmission resource belongs to the first resource pool, the first communication device selects a first destination tunnel, where the first destination tunnel is used to send the first information to a second communication device; or when the transmission resource belongs to the second resource pool, the first communication device selects a second destination tunnel, where the second destination tunnel is used to send the second information.

The first information is used by the first communication device to discover the second communication device, or is used for the first communication device to be discovered by the second communication device.

Based on the communication method, flexible configuration of sidelink communication between terminals can be implemented, and reliability of system adaptation can be improved.

In a possible implementation, the first destination tunnel or the second destination tunnel has a destination identity, and the first communication device indicates a correspondence between the destination identity and the first information to a network device. Therefore, the network device may obtain the correspondence, to effectively configure a resource pool, and implement sidelink communication between terminals.

In a possible implementation, the first communication device performs the following actions:

receiving downlink control information from the network device; and sending the first information on the transmission resource of the first resource pool based on the downlink control information in a first format; or sending the second information on the transmission resource of the second resource pool based on the downlink control information in a second format; or receiving downlink control information from the network device; and sending the first information on the transmission resource of the first resource pool or the second information on the transmission resource of the second resource pool based on the downlink control information in a third format; or sending the second information on the transmission resource of the second resource pool based on the downlink control information in a second format; or receiving downlink control information from the network device; and sending the first information on the transmission resource of the first resource pool or the second information on the transmission resource of the second resource pool based on the downlink control information in a second format.

A total quantity of the first resource pools and the second resource pools is not greater than a preset value.

Therefore, the communication device may determine, based on different formats of the downlink control information, an appropriate resource pool for information transmission. This improves flexibility of a communication system, and reduces design complexity.

In a possible implementation, when the first information is in a to-be-transmitted state, the first communication device selects the transmission resource of the first resource pool based on the first information. Similarly, when normal information is in the to-be-transmitted state, the first communication device selects a transmission resource of a normal resource pool based on the normal information. Different resource pools are used to transmit different information, so that communication quality and reliability can be improved for different scenarios such as a sidelink discovery process or normal communication on a sidelink.

In a possible implementation, the first communication device sends a request message to the network device, to request to configure the transmission resource of the first resource pool for the first information. The first communication device receives a configured grant response from the network device, where the response indicates the transmission resource of the first resource pool. Based on the request of the communication device, the network device may schedule a resource in real time, to ensure current communication. This implements accurate resource scheduling.

In a possible implementation, the first communication device receives indication information from the network device, to indicate that the first resource pool supports the first information and the second information, and the second resource pool supports information other than the first information. The communication device may learn, through the indication of the network device, use possibilities of different resource pools. This improves communication efficiency.

In a possible implementation, when both the first information and the second information are in the to-be-transmitted state, the first communication device determines priorities of the first information and the second information. When the priority of the first information is not lower than the priority of the second information, the first communication device sends the first information by using the transmission resource of the first resource pool. When the priority of the first information is higher than the priority of the second information, the first communication device sends the second information by using the transmission resource of the first resource pool. Higher-priority information is identified by determining a priority of information transmission, and it is ensured that the higher-priority information is preferential transmitted, so that communication reliability can be ensured.

In a possible implementation, the first communication device determines that the transmission resource belongs to a first part or a second part of the first resource pool. When the transmission resource belongs to the first part of the first resource pool, the first communication device sends the first information by using the first part; or when the transmission resource belongs to the second part of the first resource pool, the first communication device sends the second information by using the second part. Resources in a resource pool are divided, so as to ensure that different resources are used for transmission of different information.

In a possible implementation, the communication device is a terminal, and the network device is a base station; or the network device is a central unit CU.

According to a second aspect, a sidelink communication method is provided. The method includes: A network device sends configuration information to a first communication device, where the configuration information includes configuration of a first resource pool and configuration of a second resource pool, the first resource pool is used for first information, and the second resource pool is used for second information. The network device sends a transmission resource to the first communication device, where the transmission resource belongs to the first resource pool or the second resource pool.

When the transmission resource belongs to the first resource pool, a first destination tunnel is used by the first communication device to send the first information to a second communication device; or when the transmission resource belongs to the second resource pool, a second destination tunnel is used by the first communication device to send the second information.

The first information is used by the first communication device to discover the second communication device, or is used for the first communication device to be discovered by the second communication device.

In a possible implementation, the first destination tunnel or the second destination tunnel has a destination identity, and the network device receives a correspondence between the destination identity and the first information from the first communication device.

In a possible implementation, the network device performs the following action:

sending downlink control information to the first communication device, where the downlink control information in a first format is used to schedule the first communication device to send the first information on the transmission resource of the first resource pool; or the downlink control information in a second format is used to schedule the first communication device to send the second information on the transmission resource of the second resource pool; or sending downlink control information to the first communication device, where the downlink control information in a third format is used to schedule the first communication device to send the first information on the transmission resource of the first resource pool or send the second information on the transmission resource of the second resource pool; or the downlink control information in a second format is used to schedule the first communication device to send the second information on the transmission resource of the second resource pool; or sending, by the network device, downlink control information to the first communication device, where the downlink control information in a second format is used by the first communication device to send the first information on the transmission resource of the first resource pool or send the second information on the transmission resource of the second resource pool. A total quantity of the first resource pools and the second resource pools is not greater than a preset value.

In a possible implementation, the network device receives a request message from the first communication device, where the request message is used to request to configure the transmission resource of the first resource pool for the first information. The network device sends a configured grant response to the first communication device, where the response indicates the transmission resource of the first resource pool.

In a possible implementation, the network device sends indication information to the first communication device, to indicate that the first resource pool supports the first information and the second information, and the second resource pool supports information other than the first information and the second information.

According to a third aspect, a sidelink relay communication method is provided. The method includes: A first terminal device reports a measurement report to a base station, where the measurement report includes at least one new radio cell global identifier (NCGI) of a second terminal device.

The first terminal device is a remote terminal, and the second terminal device is a relay terminal. In addition, the measurement report may be reported after a discovery message is sent.

In an MOCN scenario, the discovery message sent by the second terminal device may include a plurality of NCGIs. Generally, the NCGI is used to uniquely identify a cell globally, and may include at least one PLMN identity and a corresponding cell identity. For example, cell access related information in the discovery message may include at least one piece of NCGI information. In this case, the base station may receive different NCGIs from different first terminal devices. To determine the NCGIs carried in the measurement reports sent by the first terminal devices, and avoid misunderstanding caused by inconsistent behavior of the terminals, the base station may determine, based on the foregoing communication method, the NCGIs reported by the first terminal devices for a same second terminal device. This improves communication quality.

In a possible implementation, each PLMN identity corresponds to one cell identity. Generally, different PLMN identities may correspond to a same cell identity, or correspond to different cell identities.

In a possible implementation, the measurement report may further include an identifier of the second terminal device. For example, the identifier of the second terminal device may be a source layer-2 identity (source layer-2 ID) used by the second terminal device to send the discovery message.

In a possible implementation, an NCGI that is of a serving cell of the second terminal device and that is included in the measurement report may be an $N^{th}$ PLMN identity and a cell identity corresponding to the $N^{th}$ PLMN in a PLMN list included in the discovery message, where N is a positive integer. For example, the $N^{th}$ PLMN identity may be a $1^{st}$ PLMN identity or a last PLMN identity in the PLMN list.

In a possible implementation, the NCGI that is of the serving cell of the second terminal device and that is included in the measurement report may be a PLMN identity selected by the first terminal device and a cell identity corresponding to the PLMN identity, and the selected PLMN identity is a PLMN identity reported by the first terminal device to the base station when the first terminal device enters a connected state.

In a possible implementation, the NCGI that is of the serving cell of the second terminal device and that is included in the measurement report may be all NCGIs included in the discovery message. For example, all the NCGIs may be an NCGI included in the cell access related information of the second terminal device in the discovery message, and an NCGI separately included in the discovery message. The separately included NCGI is a PLMN identity selected by the second terminal device and a cell identity corresponding to the PLMN identity.

In a possible implementation, the NCGI that is of the serving cell of the second terminal device and that is included in the measurement report may be an NCGI separately included in the discovery message.

According to a fourth aspect, an apparatus for sidelink communication or sidelink relay communication is provided. The apparatus may be configured to perform the operations performed by the communication device in any one of the first aspect or the third aspect and the possible implementations of the first aspect or the third aspect. Specifically, the apparatus may include modules or units configured to perform the operations performed by the communication device in any one of the possible implementations of the first aspect or the third aspect.

According to a fifth aspect, an apparatus configured for sidelink communication is provided. The apparatus may be configured to perform the operations performed by the network device in any one of the second aspect or the possible implementations of the second aspect. Specifically, the apparatus may include modules and units configured to perform the operations performed by the network device in any one of the possible implementations of the second aspect.

According to a sixth aspect, a terminal device is provided. The terminal device includes a processor, a transceiver, and a memory. The processor, the transceiver, and the memory communicate with each other through an internal connection path. The memory is configured to store instructions, and the processor is configured to execute the instruction stored in the memory. When the processor executes the instruction stored in the memory, the terminal device is enabled to perform any method in any one of the possible implementations of the first aspect or the third aspect, or the terminal device is enabled to implement the apparatus according to the fourth aspect.

According to a seventh aspect, a network device is provided. The network device includes a processor, a transceiver, and a memory. The processor, the transceiver, and the memory communicate with each other through an internal connection path. The memory is configured to store instructions, and the processor is configured to execute the instruction stored in the memory. When the processor executes the instruction stored in the memory, the network device is enabled to perform the method in any one of the possible implementations of the second aspect, or the network device is enabled to implement the apparatus according to the fifth aspect.

According to an eighth aspect, a chip system is provided, including a memory and a processor. The memory is configured to store a computer program, and the processor is configured to invoke the computer program from the memory and run the computer program, so that a device (for example, a network device or a terminal device) onto which the chip system is installed performs any method in any one of the first aspect, the second aspect, or the third aspect and the possible implementations of the first aspect, the second aspect, or the third aspect.

According to a ninth aspect, a computer program product is provided. The computer program product includes computer program code. When the computer program code is run by a communication unit and a processing unit or by a transceiver and a processor of a device (for example, a network device or a terminal device), the device performs any method in any one of the first aspect, the second aspect, or the third aspect and the possible implementations of the first aspect, the second aspect, or the third aspect.

According to a tenth aspect, a computer-readable storage medium is provided. The computer-readable storage medium stores a program, and the program enables a device (for example, a network device or a communication device) to perform any method in any one of the first aspect, the second aspect, or the third aspect and the possible implementations of the first aspect, the second aspect, or the third aspect.

According to an eleventh aspect, a computer program is provided. When the computer program is executed on a computer, the computer is enabled to implement any method in any one of the first aspect, the second aspect, or the third aspect and the possible implementations of the first aspect, the second aspect, or the third aspect.

DETAILED DESCRIPTION OF ILLUSTRATIVE EMBODIMENTS

The following clearly describes the technical solutions in embodiments of the present invention with reference to the accompanying drawings in embodiments of the present invention.

Figure 1A:
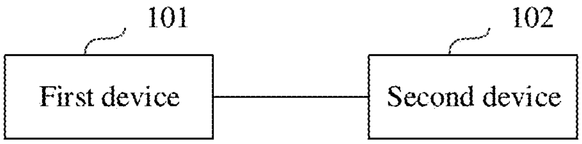
FIG. 1*a* is a schematic diagram of a communication system according to an embodiment of this application.

To resolve a problem in the conventional technology that transmission between terminals cannot be performed in different communication scenarios, an embodiment of the present invention provides a technical solution based on a communication system in FIG. 1*a*, to improve transmission effectiveness in the communication system.

FIG. 1*a* is a schematic diagram of a possible system architecture to which an embodiment of this application is applicable. The system architecture shown in FIG. 1*a* includes a second device 101 and a first device 102. The second device in this embodiment of this application may be connected to the first device in a wireless manner. In other words, the second device may communicate with the first device through a wireless network. It should be understood that FIG. 1*a* is merely a schematic diagram of the communication system architecture. A quantity of first devices and a quantity of second devices in the communication system are not limited in embodiments of this application. In this embodiment, the wireless manner may be understood as sidelink communication and/or wireless link communication.

Figure 1B:
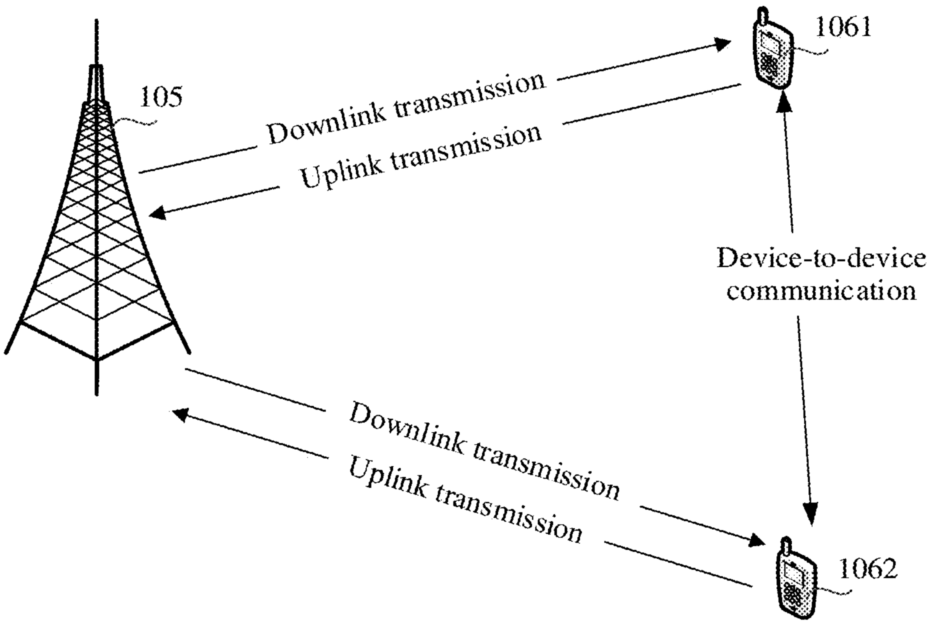
FIG. 1*b* is a schematic diagram of a communication system according to an embodiment of this application.

In an example, the first device and the second device in the foregoing system architecture may perform sidelink communication. FIG. 1*b* is a schematic diagram of a sidelink communication scenario. As shown in FIG. 1*b*, the communication scenario may include a network device 105 and one or more terminal devices (for example, a terminal device 1061 and a terminal device 1062). Data may be transmitted between the network device 105 and each of the terminal device 1061 and the terminal device 1062 by using an air interface resource, and data may be transmitted between the terminal device 1061 and the terminal device 1062 by using a sidelink resource. The first device may be the terminal device 1061, and the second device may be the terminal device 1062, or vice versa. In FIG. 1*b*, uplink transmission is used as an example. A data channel on which uplink data is transmitted between the network device 105 and the terminal device (the terminal device 1061 or the terminal device 1062) may be carried on a first uplink (UL) carrier or a supplementary uplink (SUL) carrier. A data channel on which data is transmitted between the terminal device 1061 and the terminal device 1062 may be carried on an SL carrier. In an example, the SL carrier may be a second UL carrier. The first UL carrier and the second UL carrier may be a same carrier.

The sidelink (SL) communication is a technology that allows terminal devices to communicate with each other, and a resource used to carry communication of the terminal devices may be referred to as a sidelink resource. Because the sidelink communication can implement direct communication between different terminal devices, a high data rate, a low latency, and low power consumption can be implemented. The sidelink communication may include, for example, vehicle-to-vehicle, vehicle-to-infrastructure, vehicle-to-pedestrian, and device-to-device communication. It may be understood that, in both an industrial internet communication scenario and a wireless grid network communication scenario, a sidelink communication technology may be used.

Figure 1C:
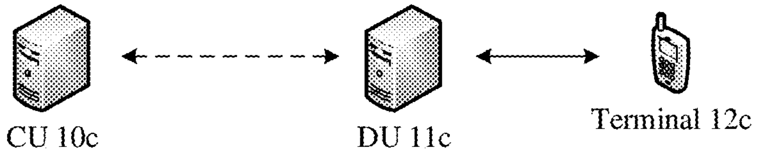
FIG. 1*c* is a schematic diagram of a communication system according to an embodiment of this application.

As shown in FIG. 1*c*, the communication system includes at least a central unit (CU) 10*c* and a distributed unit (DU) 11*c*. The DU 11*c* communicates with a terminal 12*c*. For example, some functions of an NR base station are deployed on the CU, and remaining functions are deployed on the DU. In this case, there may be one or more DUs, and a plurality of DUs may share one CU, thereby reducing costs and facilitating network expansion. Specifically, CU-DU division may be performed by protocol stacks. A possible manner is to deploy at least one of the following protocol layers on the CU: a radio resource control (RRC) layer, a service data adaptation protocol (SDAP) layer, and a packet data convergence protocol (PDCP) layer. At least one of the following remaining protocol layers is deployed on the DU: a radio link control (RLC) layer, a media access control (MAC) layer, or a physical layer. The CU and the DU may be connected through an F1 interface. The CU represents that the NR base station is connected to an NR core network. A person skilled in the art may understand that the CU and the DU may be located on different physical entities or be independent of the NR base station. In other words, the CU and the DU are combined to implement functions of the NR base station or replace the NR base station.

In the foregoing network architecture, signaling generated by the CU may be sent to a terminal device by using DUs, or signaling generated by a terminal device may be sent to the CU by using the DUs. The DU may transparently transmit the signaling to the terminal device or the CU by directly encapsulating the signaling at a protocol layer without parsing the signaling. In the following embodiments, if transmission of such signaling between the DU and the terminal device is included, sending or receiving of the signaling by the DU includes this scenario. For example, signaling of an RRC layer or a PDCP layer is finally processed as signaling of a PHY layer and sent to the terminal device, or signaling of an RRC layer or a PDCP layer is converted from received signaling of a PHY layer. In this architecture, it may also be considered that the signaling at the RRC layer or the PDCP layer is sent by the DU, or sent by the DU and a radio frequency apparatus.

The system architecture and the service scenario described in embodiments of the present invention are intended to describe the technical solutions in embodiments of the present invention more clearly, and do not constitute a limitation on the technical solutions provided in embodiments of the present invention. A person of ordinary skill in the art may know that: With the evolution of the network architecture and the emergence of new service scenarios, the technical solutions provided in embodiments of the present invention are also applicable to similar technical problems.

The technical solutions of embodiments of this application may be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system. The technical solutions in embodiments of this application may be further applied to device-to-device (D2D) communication, machine-to-machine (M2M) communication, machine type communication (MTC), and communication in an internet of vehicles system. Communication modes in the internet of vehicles system are collectively referred to as V2X (X represents everything). For example, the V2X communication includes vehicle-to-vehicle (V2V) communication, vehicle-to-infrastructure (V2I) communication, vehicle-to-pedestrian (V2P) communication, or vehicle-to-network (V2N) communication.

The network device in the communication system may be any device that has a wireless transceiver function or a chip that can be disposed in the device. The device includes but is not limited to an evolved NodeB (eNB), a radio network controller (RNC), a NodeB (NB), a base station controller (BSC), a base transceiver station (BTS), a home NodeB (for example, a home evolved NodeB, or a home NodeB, HNB), a donor eNB (DeNB), a baseband unit (BBU), an access point (AP), a wireless relay node, a wireless backhaul node, a transmission point (TP), a transmission and reception point (TRP), and the like in a wireless fidelity (Wi-Fi) system. Alternatively, the device may be a gNB or a transmission point (TRP or TP) in a 5G system, for example, an NR system, may be an antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, a gNB may include a central unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical layer (PHY). Information at the RRC layer eventually becomes information at the PHY layer, or is converted from the information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

It should be further understood that a terminal device in the communication system may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone, a tablet (Pad), a computer having a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application. In this application, the foregoing terminal device and a chip that can be disposed in the foregoing terminal device are collectively referred to as a terminal device. For ease of understanding for this application, before the communication method provided in this application is described, concepts in this application are first briefly described.

For ease of understanding, related terms and technologies in embodiments of this application are first briefly described.

Propagation Type of Sidelink Communication

A sidelink communication system is similar to a wireless communication system, and may also support broadcast, unicast, and multicast transmission manners. Broadcast is similar to broadcasting system information by the base station to the terminal. For example, the base station sends broadcast service data to UE without encryption, and any other UE within an effective receiving range may receive the broadcast service data if the UE is interested in a broadcast service. Unicast is similar to data communication performed after a radio resource control (RRC) connection is established between UE and a base station, and a unicast connection needs to be first established between two UEs. After the unicast connection is established, the two UEs may perform data communication based on a negotiated identifier, where data may or may not be encrypted. Compared with broadcast communication, the unicast communication can be performed only between two UEs between which a unicast connection has been established. Multicast communication refers to communication between all UEs in a communication group, and any UE in the group can receive and send multicast service data.

Specifically, broadcast transmission may be referred to as broadcast sidelink signal communication, or may be referred to as sidelink communication of a broadcast service, or sidelink communication whose transmission type is broadcast. Multicast transmission may be referred to as multicast sidelink signal communication, or may be referred to as sidelink communication of a multicast service, or sidelink communication whose transmission type is multicast. Unicast communication may be referred to as unicast sidelink signal communication, or may be referred to as sidelink communication of a unicast service, or sidelink communication whose transmission type is unicast.

Based on any one of the foregoing propagation types, when data is transmitted on a sidelink, a source identity (source ID) and a destination identity (destination ID) need to be carried. In this embodiment, the identifiers are for a layer 2 (L2) of the UE. Specifically, an upper layer or a layer 1 (L1) of the UE is a PC5-S layer, and is used for communication between terminals. The upper layer may be referred to as a non-access stratum (NAS), a V2X layer, or a PC5-S layer. The layer 2 of the UE may be an AS stratum, and is used for communication between the terminal and the base station. For the broadcast, the destination identity corresponds to a broadcast service, and the source identity may be understood as an identifier of transmit-end UE. For the unicast, the destination identity is an L2 identity allocated by receive end UE to the unicast connection, and the source identity is an L2 identity allocated by the transmit-end UE to the unicast connection. For the multicast, the destination identity corresponds to a group, and the source identity may be understood as an identifier of the transmit-end UE.

Figure 2A:
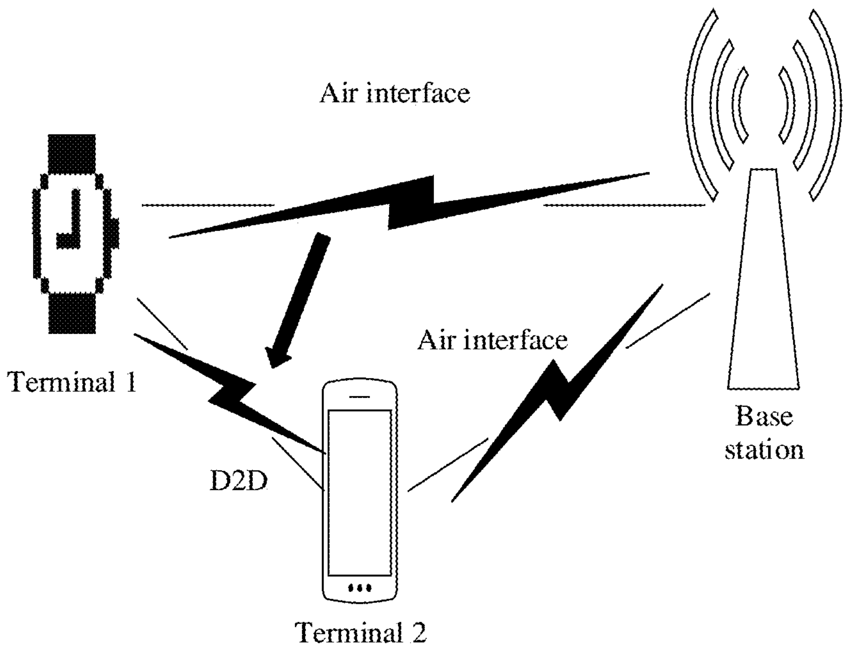
FIG. 2*a* is a schematic diagram of a communication system according to an embodiment of this application.
Figure 2B:
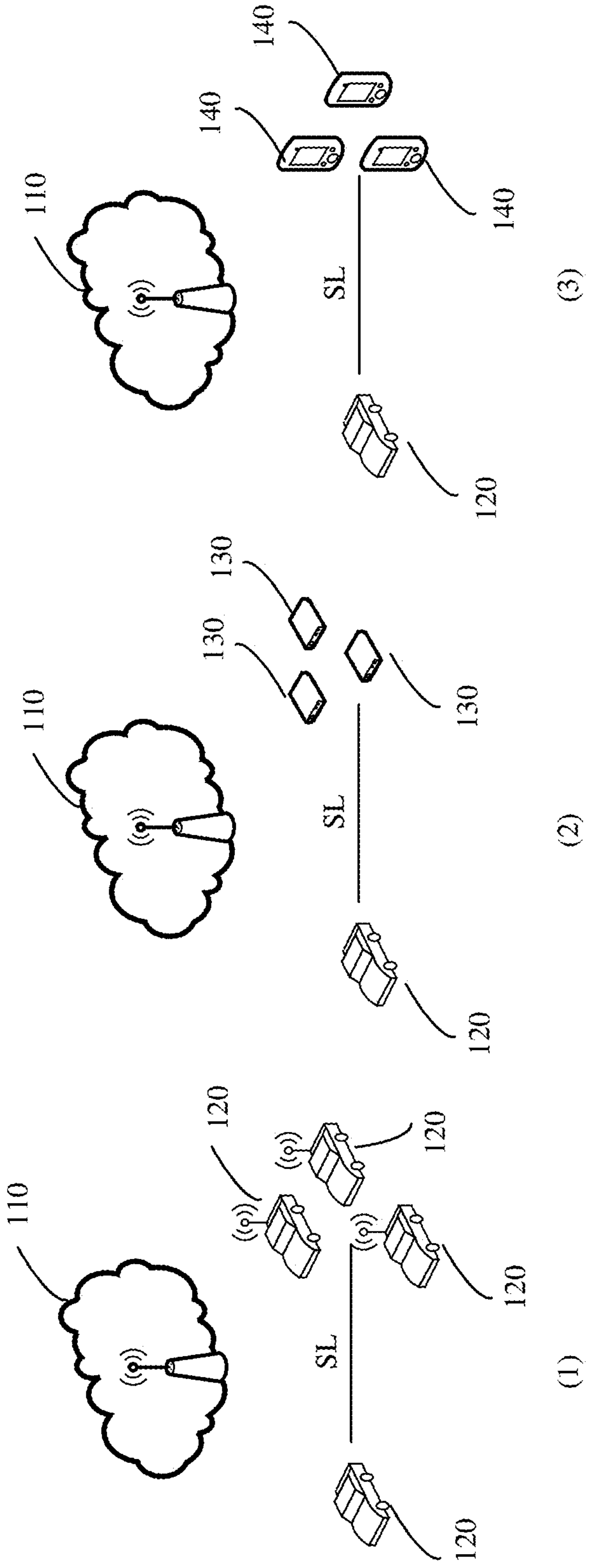
FIG. 2*b* is a schematic diagram of a communication system according to an embodiment of this application.

In a possible manner, as shown in FIG. 2*a* and FIG. 2*b*, data is transmitted and received through a D2D or V2X sidelink (SL). The SL is a D2D link shown in FIG. 2*a* and an SL link shown in FIG. 2*b*. On the SL, data transmitted between terminal devices may not be forwarded by a network device. In other words, the SL may be a transmission link between the terminal devices.

As shown in FIG. 2*b*, a vehicle may obtain road condition information or receive an information service in time through V2V, V2I, V2P, or V2N communication. These communication modes may be collectively referred to as V2X communication. In FIG. 2*b*, a FIG. (1), a FIG. (2), and a FIG. (3) are respectively schematic diagrams of V2V, V2I, and V2P communication. 110 is a network device. 120 may represent a vehicle, 130 may represent a roadside infrastructure, and 140 may represent a pedestrian. Most common V2V communication and V2I communication are used as an example. As shown in the FIG. (1) in FIG. 2*b*, a vehicle may broadcast, to a surrounding vehicle through the V2V communication, information about the vehicle such as a vehicle speed, a driving direction, a specific position, and whether an emergency brake is stepped on, and a driver of the surrounding vehicle can obtain the information, to better perceive a traffic condition outside a line of sight, so as to predict a dangerous condition in advance and avoid the dangerous condition. For the V2I communication shown in the FIG. (2) in FIG. 2*b*, in addition to the foregoing exchange of security information, a roadside infrastructure, for example, a road side unit (RSU), may provide various types of service information and data network access for a vehicle, and functions such as electronic toll collection and in-vehicle infotainment greatly improve traffic intelligence.

Sidelink Resource

The sidelink resource is a resource used for communication between terminals. The sidelink resource may include a sidelink resource in frequency domain and a sidelink resource in time domain. In addition, a sidelink in this application may also be referred to as a sidelink or a sidelink. The following describes the sidelink in a unified manner.

From a perspective of a transmission type, the sidelink resource may include a sidelink sending resource and a sidelink receiving resource. The sidelink sending resource is used to send information, for example, send control information and/or data. The sidelink receiving resource is used to receive information, for example, receive control information and/or data. A person skilled in the art may understand that the sending resource and the receiving resource may be located in a same time domain and/or frequency domain range. For example, based on a time division system, sending and receiving may share a same frequency domain resource. Based on a frequency division system, sending and receiving may share a same time domain resource.

Optionally, the sidelink signal may include control information and/or data and/or feedback information carried on a sidelink channel.

Optionally, the control information may be information used to schedule data, for example, downlink control information (DCI) and sidelink control information (SCI) in the conventional technology. The feedback information may be information that is fed back, for example, uplink control information (UCI) and sidelink feedback information (SFCI) in the conventional technology. The control information may be carried on a control channel, for example, a PSCCH, physical sidelink control channel. The feedback information may be carried on a feedback channel, for example, a PSFCH, physical sidelink feedback channel.

Optionally, the data may be a signal in a broad sense, may be a data packet, or may be a transport block or a codeword. The data may be carried on a data channel, for example, a PSSCH, physical sidelink shared channel.

Sidelink Data Radio Bearer

Communication in an NR sidelink network may be distinguished in a service flow-based manner. For example, an IP flow or an Ethernet flow may be understood as corresponding to different services. The foregoing service flows are classified into different quality of service (QoS) flows based on different QoS parameters or features. Specifically, the base station maps the QoS flow to a sidelink data radio bearer (DRB), or defines a mapping relationship between the QoS flow and the sidelink DRB. For example, the base station maps different QoS flows to different sidelink DRBs, or maps QoS flows with similar parameters to a same sidelink DRB. The terminal establishes the sidelink DRB based on the mapping relationship, and sends a corresponding QoS flow to another terminal by using the sidelink DRB. The sidelink DRB is a DRB used to transmit data between the terminals.

Logical Channel

The uplink data may be classified based on different types of services transmitted by the terminal, and correspond to different logical channels. Correspondingly, the logical channel information may be a logical channel (LCH) identifier and/or a logical channel group (LCG) identifier. A person skilled in the art may understand that, any identifier used to identify the logical channel or the logical channel group falls within the protection scope of the present invention. The LCG may include at least one LCH. For example, four LCHs or eight LCHs may form one LCG. A difference is that data volumes of LCGs formed by different quantities of LCHs are different. Usually, different LCHs may correspond to a same uplink resource type or different uplink resource types. Different LCHs in one LCG may correspond to a same uplink resource type or different uplink resource types. One LCH may correspond to at least one uplink resource type. For another example, a priority sequence of different LCHs/LCGs may depend on characteristics of uplink data carried on the LCHs/LCGs. The priority sequence of the LCHs/LCGs may be understood as a sequence of sending uplink data to the base station by the terminal. For example, the priority sequence of the LCHs/LCGs may be determined based on any one or more of the following cases:

strictness of the uplink data on a latency requirement;

data amount of the uplink data;

a wait time of the uplink data in a buffer; or a type of the uplink data.

Alternatively, a priority of the LCG may be associated with an LCH in the LCG. For example, the LCG includes an LCH 1 and an LCH 2, and a priority of the LCG 1 is higher than a priority of the LCG 2. In this case, for the priority of the LCG, refer to the priority of the LCG 1, or the priority of the LCG is the same as the priority of the LCG 1.

In this embodiment of this application, a V2X system is used as an example. Regardless of broadcast, unicast, or multicast, if terminals within coverage of a sidelink need to normally communicate with each other, a discovery process usually needs to be first performed to find a sending terminal or a receiving terminal corresponding to the terminal, so as to further transmit information. For ease of description, sidelink communication other than the discovery process is referred to as normal communication below. A person skilled in the art may understand that, in terms of a communication process, the normal communication may include an RRC process; and in terms of a transmission object, the normal communication may include signaling or data transmission.

Specifically, in an example in which UE 1 to UE 5 exist on the sidelink, the discovery process may include the following two modes.

Model A

The UE 1 communicates with the base station based on a wireless network, and the UE 1 attempts to perform normal communication with any one of the UE 2 to the UE 5 based on the sidelink. Therefore, the UE 1 triggers the discovery process, and broadcasts a message to the UE 2 to the UE 5, so that the UE 1 is found by any one or more of the UE 2 to the UE 5.

Optionally, the UE 1 in the model A may be referred to as a relay terminal (relay UE), and the UE 2 to the UE 5 may be referred to as remote terminals (remote UE).

Model B

The UE 2 to the UE 5 communicate with the base station based on the wireless network, and the UE 1 attempts to perform normal communication with any one of the UE 2 to the UE 5 based on the sidelink. Therefore, the UE 1 triggers the discovery process, and broadcasts a message to the UE 2 to the UE 5, so that the UE 1 receives a response message sent by any one or more of the UE 2 to the UE 5.

Optionally, the UE 2 to the UE 5 in the model B may be referred to as relay terminals (relay UE), and the UE 1 may be referred to as a remote terminal (remote UE).

The broadcast message and the response message in model A or model B are referred to as first information or discovery information below, and are used for mutual search or discovery between terminals. For example, the first information may be used by the first communication device to discover the second communication device (for the model A), or used for the first communication device to be discovered by the second communication device (for the model B).

In this embodiment of the present invention, when the terminal device communicates with another terminal device by using a resource pool, the terminal device needs to first know resource pools that are used in a discovery process or used for transmission of discovery information in a discovery process, and resource pools that are used in a normal communication process or used for transmission of normal information in a normal communication process. The following describes M resource pools (M is a positive integer greater than 1) configured for the terminal in different scenarios.

Scenario 1: Some resource pools in the M resource pools are used for transmission of the discovery information. The resource pools are used only for transmission of the discovery information, and are referred to as a discovery resource pool or a first resource pool below. A resource pool other than the resource pools in the M resource pools is used for transmission of only the normal information, and is referred to as a normal resource pool or a second resource pool below.

Scenario 2: Some resource pools in the M resource pools may be used for transmission of both the discovery information and the normal information, and are referred to as a discovery resource pool or a first resource pool below. A resource pool other than the resource pools in the M resource pools is used for transmission of only the normal information, and is referred to as a normal resource pool or a second resource pool below.

For the scenarios 1 and 2, a sidelink resource may be obtained in a base station scheduling mode (mode 1) and a UE-selected mode (mode 2).

In the base station scheduling mode (mode 1), the base station may indicate a resource pool to which a currently scheduled resource belongs. After receiving the scheduled sidelink resource, the UE first determines a destination tunnel, that is, determines a destination tunnel on which information is sent. Optionally, the UE further selects and sends a logical channel on the destination tunnel, to send information based on the logical channel. The destination tunnel may be for unicast, multicast, or broadcast.

In the UE-selected mode (mode 2) behavior after the UE determines the sidelink resource is similar to that in the base station scheduling mode. However, before the UE determines the sidelink resource, the UE needs to autonomously select a resource pool. There is a possibility that if current to-be-sent information requires HARQ feedback, the UE needs to select a corresponding resource pool based on a physical sidelink feedback channel (PSFCH). There is another possibility that the UE performs autonomous selection, that is, the UE autonomously selects a resource pool.

A person skilled in the art may understand that the destination tunnel may also be referred to as a destination tunnel or may be directly referred to as a destination. For example, the destination tunnel is used by a sending terminal on a sidelink to transmit information to a receiving terminal. The information may be any one or more of unicast, broadcast, and multicast information. This is not limited in the present invention. Specifically, the destination tunnel may be indicated by using three-dimensional information: a source identity, a destination identity, and a propagation type, where the propagation type includes unicast, broadcast, and multicast.

In an embodiment of the present invention, discovery information is transmitted between terminals based on a discovery resource pool, and/or normal information is transmitted between terminals based on a normal resource pool, so that efficiency of communication between terminals is improved. The following provides detailed descriptions.

Figure 3:
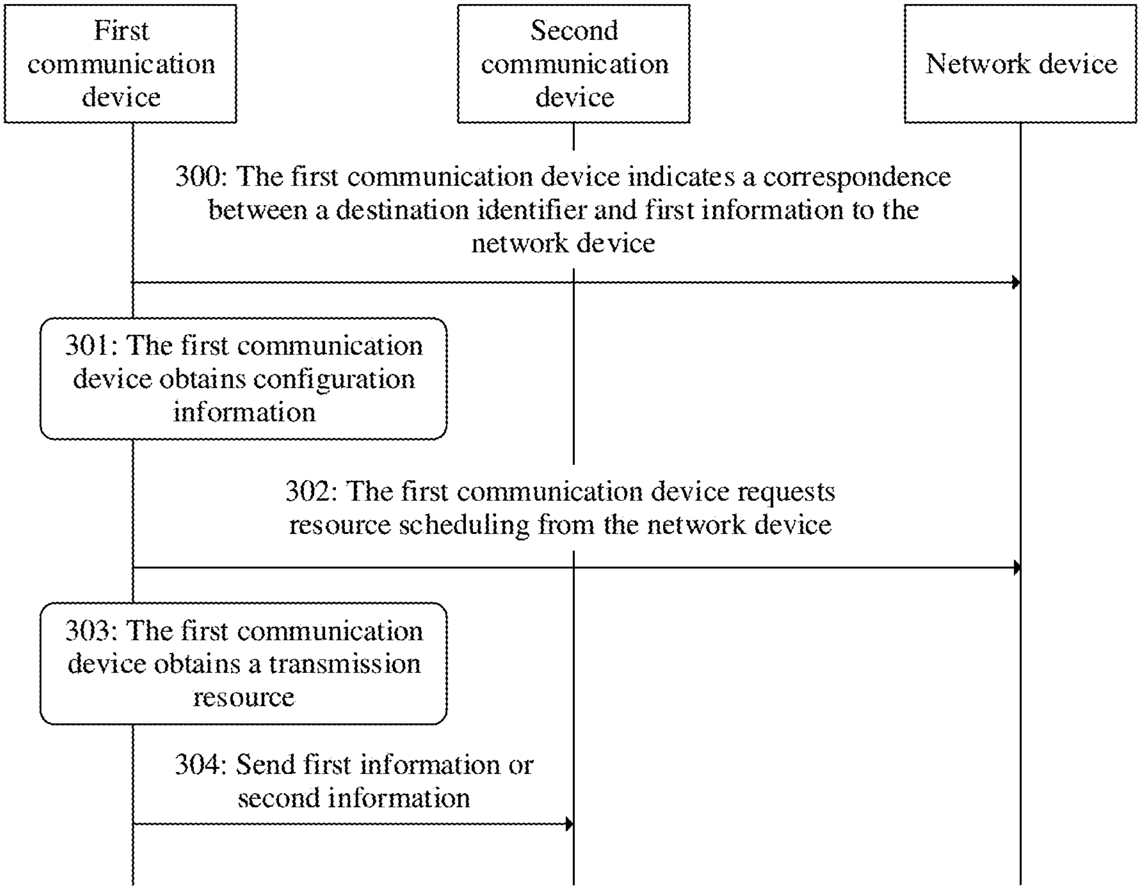
FIG. 3 is a schematic flowchart of a communication method according to an embodiment of this application.

FIG. 3 is a schematic flowchart of a communication method according to an embodiment of this application. In a sidelink scenario, a communication device is used as a terminal, and a network device is used as a base station for description. Both the communication device and the network device may be a chip, or may be implemented by a chip. This is not limited in embodiments of this application. For ease of description, the communication device may be referred to as a terminal or UE.

The method includes the following steps.

301: A first communication device obtains configuration information, where the configuration information includes configuration of a first resource pool and configuration of a second resource pool, the first resource pool is used to send first information, and the second resource pool is used to send second information.

303: The first communication device obtains a transmission resource, where the transmission resource belongs to the first resource pool or the second resource pool.

In this embodiment of the present invention, the terminal may determine a destination tunnel based on a correspondence between the transmission resource and the resource pool, to send the first information or the second information on the destination tunnel.

Specifically, when the transmission resource belongs to the first resource pool, the first communication device selects a first destination tunnel, where the first destination tunnel is used to send the first information to a second communication device; or when the transmission resource belongs to the second resource pool, the first communication device selects a second destination tunnel, where the second destination tunnel is used to send the second information. The first information is used by the first communication device to discover the second communication device, or is used for the first communication device to be discovered by the second communication device.

For a receive end of the second information, there may be at least the following cases.

Case 1: A first terminal sends the first information to a second terminal based on the first destination tunnel, to complete a discovery process. Then, the first terminal sends the second information to the second terminal based on the second destination tunnel, to perform normal communication. In other words, for communication between the first terminal and the second terminal, the case 1 covers a complete communication process between the first terminal and the second terminal, that is, includes the discovery process and the communication process of normal information transmission.

Case 2: A first terminal sends the first information to a second terminal based on the first destination tunnel, to complete a discovery process. In addition, the first terminal sends the second information to another terminal, for example, a third terminal, based on the second destination tunnel, to perform normal communication. A person skilled in the art may understand that sending of the first information and the second information in the case 2 may be synchronous or has a time difference. A time sequence of sending the first information and the second information is not limited in embodiments of the present invention.

A person skilled in the art may understand that, when there is one destination tunnel, the first terminal specifically selects one or more of a plurality of logical channels in the destination tunnel, and sends the first information or the second information based on the selected logical channel; or when there are a plurality of destination tunnels, the first terminal first selects one of the plurality of destination tunnels, and then selects one or more of a plurality of logical channels in the destination tunnel, and sends the first information or the second information based on the selected logical channel.

In 301, the first terminal may obtain resource pool configuration in different ways. In a first manner, the base station or a core network device configures a discovery resource pool or a normal resource pool for the first terminal. In a second manner, the first terminal obtains the discovery resource pool or the normal resource pool based on preconfiguration. The pre-configuration may be pre-stored in the terminal or in a subscriber identity module (SIM) card. The SIM card may also be referred to as a telephone card, or a smart card mainly used to store information such as subscriber identity data, SMS data, and a phone number.

In the first manner, that the network configures the resource pool corresponds to the mode 1. In the second manner, that the terminal configures the resource pool corresponds to the mode 2. In other words, in the first manner, the resource pool configuration is provided by the network device for the terminal, so as to ensure that a terminal that accesses a network can obtain valid resource pool configuration and perform sidelink communication based on the resource pool configuration. In the second manner, the resource pool configuration is preset in the terminal or in the SIM card, so as to ensure that the terminal can perform sidelink communication without network coverage based on the preconfigured resource pool.

In this embodiment, the UE receives sidelink configuration sent by the base station. The sidelink configuration may be sent by the base station to the UE through broadcast or RRC dedicated signaling. For example, when the UE is in an idle state or an inactive state, the base station sends the sidelink configuration to the UE by using a broadcast message. When the UE is in a connected state, the base station sends the sidelink configuration to the UE by using RRC dedicated signaling.

For example, an access network device sends system information or RRC common information to a terminal. The system information or the common RRC information may be a cell-specific parameter. A sidelink resource pool may be configured for a group of terminals by using the system information or the RRC common information. During specific implementation, the access network device may send the system information or the RRC common information to the group of terminals. The system information or the RRC common information is used to configure the sidelink resource pool for the terminals. Because the system information or the RRC common information is sent to the group of terminals, the sidelink resource pool configured by using the system information or the RRC common information may be used for multicast transmission between the terminals in the group. For example, transmit-end UE may multicast data and/or control information by using a sidelink resource configured by using the system information or the RRC common information. In this case, another terminal in the group, for example, receive-end UE, may receive the data or the control information on the corresponding sidelink resource pool.

For another example, the access network device sends RRC dedicated information to the terminal. The RRC dedicated information may be a terminal-specific parameter (or referred to as a UE-specific parameter), and the parameter is configured for the terminal. For a configuration manner of the RRC dedicated information, a sidelink resource pool may be configured for a single terminal. During specific implementation, the access network device may send the RRC dedicated information to the single terminal, and the RRC dedicated information is used to configure the sidelink resource pool for the terminal. Because the RRC dedicated information is sent to the single terminal, a sidelink resource pool configured by using the RRC dedicated information may be used for unicast transmission between the terminals. For example, a terminal 1 may send data or control information to a terminal 2 in a unicast manner by using the sidelink resource pool configured by using the RRC dedicated information.

Alternatively, an operator pre-configures a sidelink resource pool for the terminal, or pre-configures a sidelink resource pool for the terminal in a predefined manner in a standard protocol. In a preconfiguration manner, the sidelink resource pool may be configured for one or more terminals. During specific implementation, a network management system of an operator may separately send preconfigured information to the terminals, where the preconfigured information is used to separately configure the sidelink resource pool for the terminals. Because the preconfigured information is sent to a plurality of terminals, the sidelink resource pool configured by using the preconfigured information may be used for broadcast transmission between the terminals. For example, the terminal 1 may broadcast data and/or control information by using the sidelink resource pool configured by using the preconfigured information. In this case, another terminal, for example, the terminal 2, may receive the data and/or the control information on the sidelink resource pool.

During actual application, the sidelink resource pool configured by using the system information or the RRC common information may be further used for unicast and/or broadcast, the sidelink resource pool configured by using the RRC dedicated information may be further used for broadcast and/or multicast, and the sidelink resource pool configured by using preconfigured information may be further used for multicast and/or unicast. This is not limited in this application.

For example, if the terminal works in the mode 2, the terminal may select a scheduling resource to send discovery information. For example, the terminal may be within coverage of a communication network, and work based on the discovery resource pool configured by the base station. For another example, the terminal may be out of coverage of the communication network, and work based on the preconfigured discovery resource pool.

Specifically, it is assumed that the terminal works in the mode 2 and needs to send the discovery information. When the discovery information enters the logical channel and is to be sent, the terminal identifies that to-be-sent information is the discovery information, and therefore selects or reselects a discovery resource pool. For example, the terminal may identify, by using a dedicated logical channel corresponding to a default destination layer-2 identity, that the to-be-sent information is the discovery information. It may be understood that the logical channel may be used only to transmit to-be-sent information. Once identifying to-be-sent information in the logical channel, the terminal can learn that the information is discovery information without further identifying an information type.

Further, if there is normal information to be transmitted at the same time, the terminal may compare priorities of the discovery information and the normal information, to determine whether to select a discovery resource pool or a normal resource pool. If the priority of the to-be-sent information in the normal resource pool is lower than the priority of the discovery information in the discovery resource pool, the terminal selects the discovery resource pool. If the priority of the to-be-sent information in the normal resource pool is higher than the priority of the discovery information in the discovery resource pool, the terminal selects the normal resource pool. If the priorities are consistent, the terminal may perform selection, for example, always preferably select the discovery resource pool, always preferably select the normal resource pool, or select to-be-sent information that preferably enters a buffer. After selecting a resource pool, the terminal may select a currently available resource from the resource pool for transmission of the to-be-sent information. For example, the terminal may determine the currently available resource based on sensing, partial sensing, or random selection. Sensing may also be understood as full sensing, and the terminal is required to continuously sense a sidelink channel, for example, a physical sidelink control channel (PSCCH) on the sidelink, or SCI, to determine resources that are available. Compared with full sensing, partial sensing, as the name implies, requires the terminal to sense only some time domain resources to determine the available resources. Partial sensing saves more power than full sensing. Random selection is performed for some resource pools. Sensing or partial sensing may not be performed, but available resources are randomly selected. It may be understood that the time domain resource may be a time unit, for example, a frame, a subframe, a slot, a symbol, or the like, on the sidelink. This is not limited in the present invention. In this embodiment of the present invention, the base station may configure or schedule a resource in a resource pool for the terminal. Before the base station schedules the transmission resource of the discovery resource pool or the normal resource pool for the first terminal, the method may further include the following step.

302: The first communication device requests resource scheduling from the network device.

Generally, if the terminal needs to send the discovery information, the terminal may include indication information in a buffer status report (BSR), to indicate a destination identity (destination ID) corresponding to the discovery information. Specifically, the indication information may be a destination index, and indicates a location of the destination ID in a destination ID list reported by the terminal to the base station. For example, the destination identity corresponding to the discovery information and a destination identity corresponding to the normal information may be indicated and identified in a unified numbering manner. The base station may send the downlink control information to the terminal based on the obtained BSR.

Alternatively, the terminal sends a request message to the base station, to request to configure a transmission resource in a resource pool for the first information. The base station may send a configured grant response to the terminal based on the request message, to indicate the transmission resource in the resource pool.

For the foregoing different resource requests, the terminal may obtain the transmission resource in different manners, to send the first information. The following separately describes the manners.

Manner 1

The first communication device receives downlink control information from the network device.

The first communication device sends the first information on the transmission resource of the first resource pool based on the downlink control information in a first format; or the first communication device sends the second information on the transmission resource of the second resource pool based on the downlink control information in a second format.

In Manner 1, the downlink control information may have at least two formats. When receiving the downlink control information in the first format, the first terminal may determine that the transmission resource carried in the downlink control information belongs to the first resource pool, to send the first information by using the transmission resource. When receiving the downlink control information in the second format, the first terminal may determine that the transmission resource carried in the downlink control information belongs to the second resource pool, to send the second information by using the transmission resource.

For example, the communication system includes two types of the DCI. One type of the DCI is used to schedule a resource in the normal resource pool, and the other type of the DCI is used to schedule a resource in the discovery resource pool. The terminal may determine, by identifying the type of the DCI, that a currently scheduled resource belongs to a resource in the discovery resource pool or the normal resource pool.

In Manner 1, resources in different resource pools may be scheduled by using downlink control information in different formats. This simplifies terminal behavior and considers backward compatibility.

Manner 2

The first communication device receives downlink control information from the network device.

The first communication device sends the first information on the transmission resource of the first resource pool or the second information on the transmission resource of the second resource pool based on the downlink control information in a third format; or the first communication device sends the second information on the transmission resource of the second resource pool based on the downlink control information in a second format.

In Manner 2, the downlink control information may have at least two formats. When receiving the downlink control information in the third format, the first terminal may determine that the transmission resource carried in the downlink control information belongs to the first resource pool or the second resource pool. If the transmission resource belongs to the first resource pool, the first information is sent by using the first resource pool; or if the transmission resource belongs to the second resource pool, the second information is sent by using the second resource pool. When receiving the downlink control information in the second format, the first terminal may determine that the transmission resource carried in the downlink control information belongs to the second resource pool, to send the second information by using the transmission resource.

Specifically, a total quantity of resource pools configured by the base station is generally not greater than 8. In this manner, the base station does not need to ensure that the total quantity of resource pools is not greater than 8, but may introduce a new DCI format. For example, the DCI carries indication information of a resource pool to which the currently scheduled resource belongs, and the indication information indicates a location of the resource pool in a resource pool list configured by the base station. In this case, the first resource pool and the second resource pool may be uniformly numbered. For example, there is one first resource pool, and there are 15 second resource pools. After 4-bit unified numbering, the first resource pool may be identified as 0001, and the second resource pools are sequentially identified as 0001 to 1111.

In Manner 2, terminal behavior is simplified, and backward compatibility is considered. In addition, compared with Manner 1, a function of the downlink control information in Manner 2 is enhanced, and scheduling efficiency can be further improved.

Manner 3

The first communication device receives downlink control information from the network device.

The first communication device sends the first information on the transmission resource of the first resource pool or the second information on the transmission resource of the second resource pool based on the downlink control information in a second format.

A total quantity of the first resource pools and the second resource pools is not greater than a preset value.

In Manner 3, for the second format, when receiving the downlink control information, the first terminal may determine whether the transmission resource carried in the downlink control information belongs to the first resource pool or the second resource pool. If the transmission resource belongs to the first resource pool, the first information is sent by using the first resource pool; or if the transmission resource belongs to the second resource pool, the second information is sent by using the second resource pool.

Specifically, when the base station configures the resource pool, it may be ensured that a total quantity of the discovery resource pools and the normal resource pools is not greater than 8. Based on this premise, the base station may reuse a DCI format like a DCI format 0_0 or a DCI format 0_1 in the conventional technology, and indicate, in the DCI, an identifier of a resource pool to which the current scheduled resource belongs, to indicate a location of the resource pool in the resource pool list configured by the base station. For example, the base station configures eight resource pools. It is assumed that the discovery resource pool is located in the first location in the resource pool list, and is indicated by using a resource pool index, for example, index=0 in the DCI. This indicates that a sidelink resource scheduled by the base station currently belongs to a resource in the discovery resource pool.

In this case, the first resource pool and the second resource pool may be uniformly numbered. For example, there is one first resource pool, and there are 7 second resource pools. After 3-bit unified numbering, the first resource pool may be identified as 001, and the second resource pools are sequentially identified as 001 to 111.

In Manner 3, based on resource pool quantity control, different formats of the downlink control channel are used to ensure implementation constraints on the network device, thereby ensuring backward compatibility.

Manner 4

The first communication device sends a request message to the network device, to request to configure the transmission resource of the first resource pool for the first information.

That the first communication device obtains a transmission resource of the first resource pool or the second resource pool specifically includes the following step.

The first communication device receives a configured grant response from the network device, where the response indicates the transmission resource of the first resource pool.

Generally, the terminal may request, by sending terminal assistance information (UEAssistanceInformation) to the base station, the base station to perform a sidelink configured grant (sidelink CG). For example, the assistance information may carry one or more of a service period, a message size, a time offset, or a QoS flow identifier, so that the base station determines, based on a QoS parameter corresponding to a previously received QoS flow, to configure the sidelink CG for the terminal. For example, the time offset indicates a time offset, relative to a reference time point, of a time at which a first piece of discovery information arrives. For example, the reference time point may be a subframe 0 of a system frame number 0 (SFN).

For sending of the discovery information, if the terminal needs to periodically send the information, the terminal may also include indication information in the terminal assistance information, to request the base station to allocate the sidelink CG to the discovery information. A resource in the discovery resource pool needs to be used to send the discovery information, and the discovery information may not have a QoS flow identifier. Therefore, in this embodiment, the terminal may include the indication information in the terminal assistance information, to request the base station for a resource in the discovery resource pool or the sidelink configured grant.

The base station configures the sidelink CG for the terminal based on the request of the terminal. Optionally, configuration of the sidelink CG carries the indication information of the discovery resource pool, to indicate that the sidelink CG is a resource in the discovery resource pool.

Optionally, the base station may further configure a limitation for a logical channel used to send the first information, that is, limit information (that is, a discovery message) on the logical channel to only a sidelink CG in the first resource pool.

In this embodiment of the present invention, after the first communication device obtains the transmission resource, the method further includes the following step.

304: The first communication device sends the first information or the second information to the second communication device.

Generally, after obtaining the transmission resource of the first resource pool, the first communication device may send the first information or the discovery information to the second communication device based on the resource. Alternatively, after obtaining the transmission resource of the second resource pool, the first communication device may send the second information or the normal information to the second communication device based on the resource. Alternatively, the first communication device may send the second information or the normal information to another communication device other than the second communication device based on the transmission resource of the second resource pool. It may be understood that, in a time sequence, sending of the second information to the second communication device may occur after sending of the first information to the second communication device; and sending of the second information to another communication device and sending of the first information to the second communication device may occur at the same time, or may not occur at the same time. This depends on a real-time communication requirement or a real-time communication environment of the first communication device. This is not limited in the present invention.

Generally, the destination tunnel may have a destination identity, and the method further includes the following step.

300: The first communication device indicates a correspondence between the destination identity and the first information to the network device.

Optionally, in a network architecture in which the access network device includes a CU and a DU, the correspondence is sent by the terminal to the CU by using the DU. For example, the DU does not parse the correspondence, but directly encapsulates the correspondence by using a protocol layer, and then transparently transmits the correspondence to the CU. After parsing the correspondence, the CU further needs to notify the DU of the correspondence, so that the DU generates corresponding resource pool configuration for the terminal.

For example, the terminal sends sidelink terminal information (sidelinkUEinformation) to the base station, where the sidelink terminal information carries a destination identity (destination ID) in which the terminal is currently interested, and the destination ID is used to identify a unicast service, a broadcast service, or a multicast service. Because a resource used by the discovery message is different from a resource required for normal sidelink communication, when reporting, to the base station, the destination ID corresponding to the discovery information, the terminal needs to indicate the discovery information corresponding to the destination ID.

Generally, a terminal identity may include a radio network temporary identifier or a layer 2 (L2) identity. The L2 identity is used to indicate at least one of a sidelink destination identity or a sidelink source identity. The radio network temporary identifier may be an identity used to identify the terminal, and a value of the radio network temporary identifier may be 0 to 65535. The sidelink destination identity may be an L2 identity allocated by a terminal on a receive side of the sidelink communication to a unicast connection, for example, an identity corresponding to a terminal that receives a sidelink signal. The sidelink source identity may be an L2 identity allocated by a terminal on a transmit side of sidelink communication to a unicast connection, for example, an identifier corresponding to a terminal that sends a sidelink signal.

For example, 24 bits indicate the destination identity. The terminal may reserve some values for the discovery information, and remaining values are used for the normal information.

In this embodiment, the following describes in detail terminal behavior when a currently obtained resource is a resource in the discovery resource pool. A person skilled in the art may understand that there is no need to distinguish between the mode 1 and the mode 2 for the terminal behavior. In other words, the terminal may trigger or perform the following destination tunnel selection process without a need to distinguish whether the currently obtained resource is scheduled by the network device or autonomously selected by the terminal.

Optionally, inside the terminal, that a current resource is a resource in the discovery resource pool may be determined at a physical layer of the terminal, and notified to a MAC layer of the terminal, so as to perform the destination tunnel selection process.

Figure 2C:
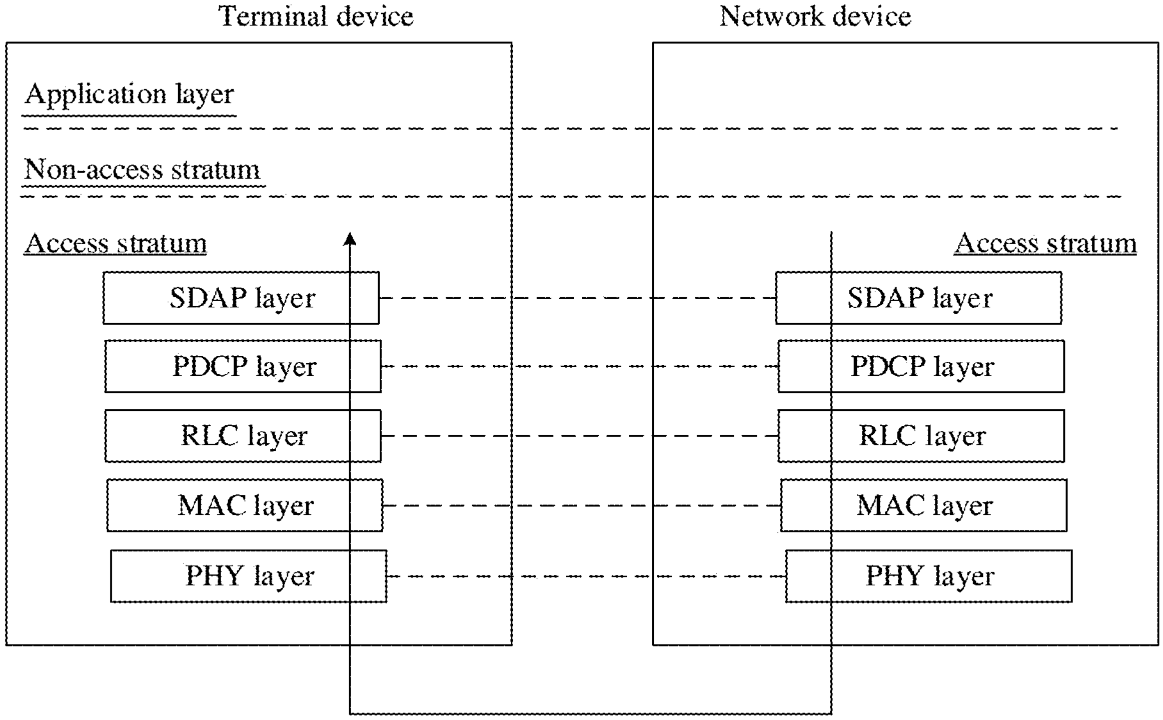
FIG. 2*c* is a schematic diagram of a protocol stack according to an embodiment of this application.

As shown in FIG. 2*c*, a protocol stack of a terminal that performs communication based on a sidelink includes at least one of the following protocol layers: a sidelink service data adaptation (SDAP) layer, a sidelink packet data convergence protocol (PDCP) layer, a sidelink radio link control (RLC) layer, a sidelink media access control layer, and a sidelink physical (PHY) layer.

The SL PDCP layer is mainly used to compress and decompress/encrypt and decrypt information. The SL RLC layer is mainly used to implement a function related to an automatic repeat request (ARQ), and segment and concatenate information or reassemble segmented and concatenated information. The SL MAC layer is mainly used to select a transmission format combination and implement functions related to scheduling and a hybrid automatic repeat request (HARQ). The SL PHY layer is mainly used to provide an information transmission service to the MAC layer and an upper layer, and perform coding and modulation processing or demodulation and decoding processing based on the selected transmission format combination. Therefore, in this embodiment of the present invention, the protocol stack of the terminal may be aggregated at any protocol layer in the PDCP layer, the RLC layer, or the MAC layer. For example, the protocol stack may be aggregated at the PDCP layer, so that reliability of information transmission can be improved through encryption and decryption. The adaptation layer is configured to perform conversion processing on data between the base station and the terminal protocol stack. By setting the adaptation layer, conversion between the protocol stacks can be ensured, so that configuration of the protocol stack in the base station is more flexible.

Generally, tunnel selection may be understood as selection of a destination tunnel and/or selection of a logical channel. For example, when there is one logical channel in the destination tunnel, the MAC layer may select the destination tunnel based on the type of the to-be-sent information, and transmit information based on the logical channel by default. When there are a plurality of logical channels in the destination tunnel, the MAC layer first selects the destination tunnel based on the type of the to-be-sent information. After the destination tunnel is selected, if there are a plurality of logical channels that have data to be transmitted, a logical channel with a highest priority is selected from the logical channels that allows transmission, to send the data.

In a possibility, when performing a logical channel prioritization (LCP) process, the MAC layer of the terminal may select a destination tunnel corresponding to the discovery information if determining that the currently scheduled resource is a resource in the discovery resource pool. The destination tunnel includes a plurality of logical channels, and the discovery information is located on at least one of the logical channels. After selecting the destination tunnel, the MAC layer of the terminal converts the discovery information in the logical channel into a MAC packet data unit (PDU), and uses a corresponding resource to send information on a PC5 interface.

Further, when the MAC layer of the terminal performs the LCP process, if it is determined that the currently scheduled resource is a resource in the normal resource pool, when selecting the destination tunnel, the terminal UE needs to exclude the destination tunnel corresponding to the discovery information. For example, the physical layer of the terminal indicates that a currently scheduled resource of the MAC layer of the terminal belongs to a normal resource pool, and the MAC layer of the terminal performs an LCP process, that is, excludes a destination tunnel corresponding to the discovery information.

The following describes a scenario in which a plurality of operators share the access network device. The scenario may have the following several cases.

1. The plurality of operators share the access network device, and a core network and a frequency are dedicated to each operator.
2. One access network device is connected to a multi-operator core network (MOCN). For example, in the MOCN, the plurality of operators may cooperate to construct an access network device, or one of the operators may construct an access network device independently, and other operators rent the access network device of the operator.

In the case 2, a common carrier frequency resource may be used, and in the case 1, an independent carrier frequency resource may be shared.

For sidelink relay communication, the base station sends a measurement configuration to the first terminal device (for example, remote UE in a connected state), so that the first terminal device measures a candidate second terminal device (for example, relay UE), to enable path switching or enable multipath configuration. In this embodiment of the present invention, the first terminal device and the base station may communicate with each other through an air interface (for example, a Uu interface), or communicate with each other by using the second terminal device.

Then, the first terminal device further senses the discovery message from the candidate second terminal device based on the obtained measurement configuration, and measures a corresponding sidelink reference signal received power (RSRP). Because the RSRP is obtained by measuring a reference signal sent along with the discovery message, the RSRP is also referred to as a sidelink discovery RSRP (SD-RSRP). When the RSRP corresponding to the candidate second terminal device meets a measurement event, the first terminal device sends a measurement report to the base station. The measurement report may include an identity of the second terminal device, an identity of a serving cell of the second terminal device, or a corresponding RSRP. Specifically, the identity of the second terminal device may be a source layer-2 identity (source layer-2 ID) used by the second terminal device to send the discovery message. The identity of the serving cell of the second terminal device may be a new radio cell global identifier (NCGI). The NCGI is used to uniquely identify a cell globally, and may include a PLMN identity and a corresponding cell identity.

Generally, sidelink relay communication is performed in an MOCN scenario. If a serving cell of the second terminal device supports MOCN, a base station of the serving cell broadcasts a plurality of PLMN identities (PLMN identity, PLMN ID) in a system information block (SIB), and each PLMN identity corresponds to one cell identity (cell ID). Generally, different PLMN identities may correspond to a same cell identity, or correspond to different cell identities. The PLMN identity may be carried in a broadcast parameter like cell access related information (cellAccessRelatedInfo), and the SIB may be a SIB 1.

Therefore, in the MOCN scenario, the discovery message sent by the second terminal device may include a plurality of pieces of NCGI information. For example, the cell access related information includes at least one piece of NCGI information. In this case, the base station may receive different NCGIs from different first terminal devices. Therefore, the base station cannot determine NCGIs reported by the first terminal device for a same second terminal device. To determine the NCGI carried in the measurement report sent by the first terminal device, and avoid misunderstanding caused by inconsistent behavior of the terminals, the following describes an NCGI design in detail.

In this embodiment of the present invention, the first terminal device may report the measurement report to the base station, where the measurement report includes the identity of the second terminal device that meets the measurement event and the identity (for example, the NCGI) of the serving cell of the second terminal device. For example, the measurement report may be reported after the discovery message is sent. A person skilled in the art may understand that receiving and sending of the measurement report may be independent of the description of the embodiment related to FIG. 3 (for example, independent of 301 to 303). The first terminal device may perform measurement after the second terminal device sends the discovery message (for example, 304), and report the measurement report to the base station when a measurement reporting condition is met.

Table 1 shows an example of the cell access related information broadcast by the base station. The related information may include a cell identity of at least one cell and at least one PLMN identity corresponding to each cell.

TABLE 1

| |
|---|
| cellAccessRelatedInfo |
| plmn-IdentityInfoList |
| plmn-IdentityInfo |
| plmn-IdentityList |
| plmn-Identity #1 |
| plmn-Identity #2 |
| cellIdentity #A |
| plmn-IdentityInfo |
| plmn-IdentityList |
| plmn-Identity #3 |
| plmn-Identity #4 |
| cellIdentity #B |

Correspondingly, the second terminal device includes the cell access related information in the discovery message, and sends the discovery message on the PC5. After measuring the discovery message sent by the second terminal device, the first terminal device sends the measurement report to the base station if a measurement result meets the measurement event. As described above, the measurement report includes an NCGI of the serving cell of the second terminal device, and the NCGI may be at least one of the following cases.

1. An $N^{th}$ PLMN identity and a cell identity corresponding to the $N^{th}$ PLMN in a PLMN list included in the discovery message, where N is a positive integer. For example, the $N^{th}$ PLMN identity may be a $1^{st}$ PLMN identity or a last PLMN identity in the PLMN list.

For example, the $1^{st}$ PLMN ID is #1, and a cell ID corresponding to the PLMN ID #1 is #A. In this case, the PLMN ID #1 and the cell ID #A may be used as cell NCGIs of the second terminal device and written into the measurement report. Alternatively, the last PLMN ID is #4, and a cell ID corresponding to the PLMN ID #4 is #B. The PLMN ID #4 and the cell ID #B may alternatively be used as cell NCGIs of the second terminal device and written into the measurement report.

2. A PLMN identity selected by the first terminal device and a cell identity corresponding to the PLMN identity, where the selected PLMN identity is a PLMN identity reported by the first terminal device to the base station when the first terminal device enters the connected state.

For example, when entering the connected state from an idle state, the first terminal device sends a radio resource control setup complete (RRCSetupComplete) message to the base station. The message carries the selected PLMN identity.

For example, when entering the connected state from an inactive state, the first terminal device sends a radio resource control resume complete (RRCResumeComplete) message to the base station. The message carries the selected PLMN identity, namely, selectedPLMN-Identity.

It should be noted that the serving base station that the first terminal device enters the connected state and the serving base station that currently reports the measurement report may be a same base station, or may be different base stations.

For example, it is assumed that the selectedPLMN-Identity indicated by the first terminal device when the first terminal device accesses the base station is a PLMN ID #3, and during measurement reporting, the PLMN ID #3 and a cell ID #B corresponding to the PLMN ID #3 are used as the NCGIs of the identity of the second terminal.

In a normal case, the serving base station when the first terminal identity enters the connected state and the current serving base station may be the same or different.

3. All NCGIs included in the discovery message. For example, all the NCGIs may be an NCGI included in the cell access related information of the second terminal device in the discovery message, and an NCGI separately included in the discovery message. The separately included NCGI is a PLMN identity selected by the second terminal device and a cell identity corresponding to the PLMN identity.

4. An NCGI separately included in the discovery message.

Specifically, in addition to the cellAccessRelatedInfo, the discovery message of the second terminal device may further include a separate NCGI. The NCGI is a PLMN identity selected by the second terminal device and a cell identity corresponding to the PLMN identity. In this case, the first terminal device may use the NCGI in the discovery message of the second terminal device as the NCGI in the measurement report.

This embodiment may further consider a backward compatibility problem, which is described in detail below.

Optionally, the method further includes the following steps.

The first communication device receives indication information from the network device, to indicate that the first resource pool supports the first information and the second information, and the second resource pool supports information other than the first information.

Backward compatibility is also referred to as backward compatibility, downward compatibility, or backtrace compatibility. That is, after a program, a database, or hardware is updated to a later version, a document or a system created by using the program of the old version can still be normally operated or used, a program developed based on the database of the old version can still be normally compiled and run, or the hardware of the old version can still be used in the new version. In this embodiment, it is considered that the discovery resource pool is redefined based on the normal resource pool. For example, in terms of resource pool design, a type of resource pool may be designed. The resource pool is used for normal sidelink communication, that is, normal information transmission, or may be used for specific sidelink communication, that is, discovery information transmission. Generally, only resources in the resource pool can be used for discovery information transmission.

For example, one resource pool is allowed to be selected from normal resource pools. In addition to supporting transmission of a normal message, the resource pool may be used to support transmission of the discovery information. In other words, on the basis of configuration of the normal resource pool, the indication information may be added to indicate that the resource pool may be used for discovery information.

Based on the resource pool, the method may further include the following steps.

When both the first information and the second information are in the to-be-transmitted state, the first communication device determines priorities of the first information and the second information.

When the priority of the first information is not lower than the priority of the second information, the first communication device sends the first information by using the transmission resource of the first resource pool.

When the priority of the first information is higher than the priority of the second information, the first communication device sends the second information by using the transmission resource of the first resource pool.

Specifically, for the mode 1, if the resource pool indicated by the base station may be used to transmit the normal information or the discovery information, the terminal may compare priorities of the destination tunnel to which the discovery information belongs and the destination tunnel of the normal information, and determine, based on the priorities, to send the discovery information or the normal information. The terminal behavior may continue to use the LCP process described above, and details are not described below again. Otherwise, if the normal resource pool is scheduled, the destination tunnel corresponding to the discovery information is excluded, and LCP process processing is performed on the destination tunnel corresponding to the normal information. For the mode 2, when there is a discovery information transmission requirement, the terminal may also select or reselect a discovery resource pool with reference to the foregoing description, and perform corresponding LCP process processing.

In this embodiment, based on the transmission resource obtained by the first communication device, the method may further include the following steps.

The first communication device determines that the transmission resource belongs to a first part or a second part of a resource pool.

When the transmission resource belongs to the first part of the resource pool, the first communication device sends the first information by using the first part.

When the transmission resource belongs to the second part of the resource pool, the first communication device sends the second information by using the second part.

It may be understood that resource division may be performed on the resource pool. For example, one of the resource pools is selected, where some resources in the resource pool are used for the discovery information, and the other resources are used for the normal information. For the resource pool, for the mode 1, after obtaining a resource that is in the resource pool and that is scheduled by the base station, the terminal first determines whether a current scheduled resource is used for the discovery information or the normal information. For the mode 2, after selecting or reselecting the resource pool, the terminal first determines whether a current scheduled resource is used for the discovery information or the normal information, and then further needs to indicate the physical layer of the terminal to randomly select or sense (or partially sense) the resources used for the discovery information transmission, and determines a resource finally used for transmission.

Figure 4:
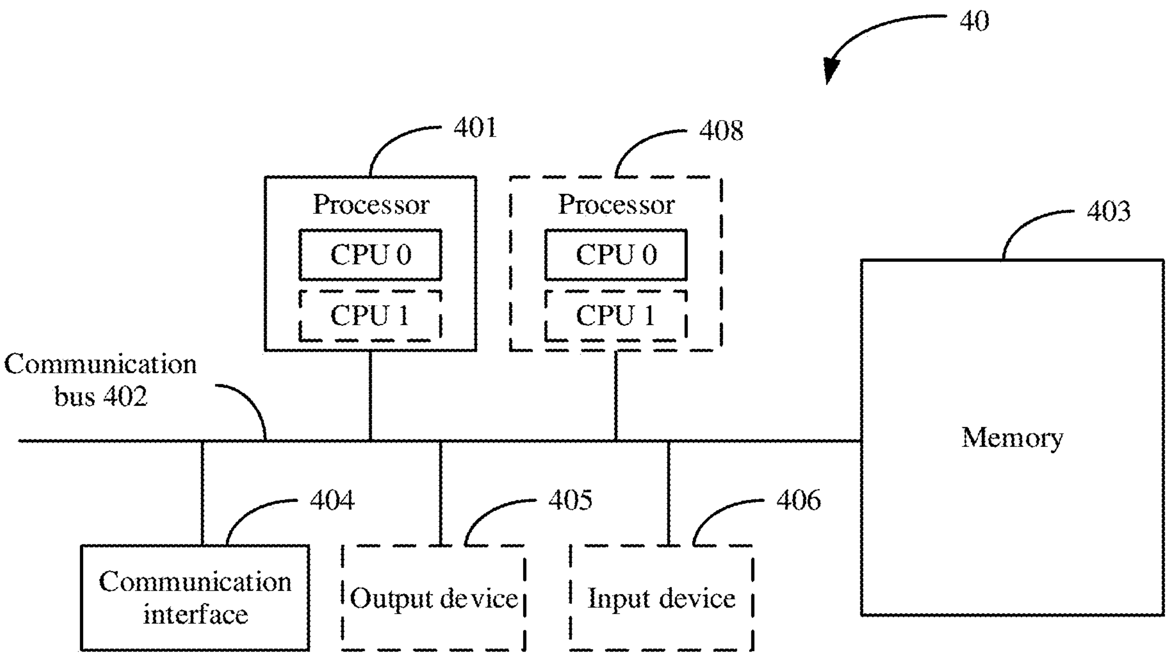
FIG. 4 is a schematic diagram of a structure of a communication apparatus according to an embodiment of this application.

FIG. 4 is a schematic structural diagram of hardware of a communication apparatus 40 according to an embodiment of this application. The communication apparatus 40 includes at least one processor 401, a communication bus 402, a memory 403, and at least one communication interface 404.

The processor 401 may be a general-purpose central processing unit (CPU), a microprocessor, an application-specific integrated circuit (ASIC), or one or more integrated circuits configured to control program execution of the solutions in this application.

The communication bus 402 may include a path on which information is transmitted between the foregoing components.

The communication interface 404 uses any transceiver-type apparatus, and is configured to communicate with another device or a communication network such as Ethernet, a radio access network (RAN), or a wireless local area network (WLAN).

The memory 403 may be a read-only memory (ROM) or another type of static storage device that can store static information and instructions, or a random access memory (RAM) or another type of dynamic storage device that can store information and instructions. Alternatively, the memory 403 may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 403 is not limited thereto. The memory may exist independently, and is connected to the processor through the bus. The memory may alternatively be integrated with the processor.

The memory 403 is configured to store and execute application program code in a solution of this application, and the processor 401 controls execution. The processor 401 is configured to execute the application program code stored in the memory 403, to implement the communication method according to the foregoing embodiment of this application.

Alternatively, optionally, in this embodiment of this application, the processor 401 may perform processing-related functions in the communication method provided in the foregoing embodiments of this application. The communication interface 404 is responsible for communicating with another device or network. This is not specifically limited in embodiments of this application.

During specific implementation, in an embodiment, the processor 401 may include one or more CPUs, for example, a CPU 0 and a CPU 1 in FIG. 4.

During specific implementation, in an embodiment, the communication apparatus 40 may include a plurality of processors, for example, the processor 401 and a processor 408 in FIG. 4. Each of the processors may be a single-core (single-CPU) processor, or may be a multi-core (multi-CPU) processor. The processor herein may be one or more devices, circuits, and/or processing cores configured to process data (for example, computer program instructions). It may be understood that FIG. 4 shows only a simplified design of the communication apparatus 40. During actual application, the communication apparatus may include any quantity of input devices, output devices, processors, memories, and communication interfaces, and the foregoing functions may be provided by any quantity of communication units separately or in a manner of a combination.

During specific implementation, in an embodiment, the communication apparatus 40 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector, or the like. The input device 406 communicates with the processor 401 and may receive a user input in a plurality of manners. For example, the input device 406 may be a mouse, a keyboard, a touchscreen device, or a sensor device.

In addition, as described above, the communication apparatus 40 provided in this embodiment of this application may be a chip, a terminal, a base station, a communication device, a network device, a CU, or a DU, or a device with a structure similar to that in FIG. 4. A type of the communication apparatus 40 is not limited in embodiments of this application.

Figure 5:
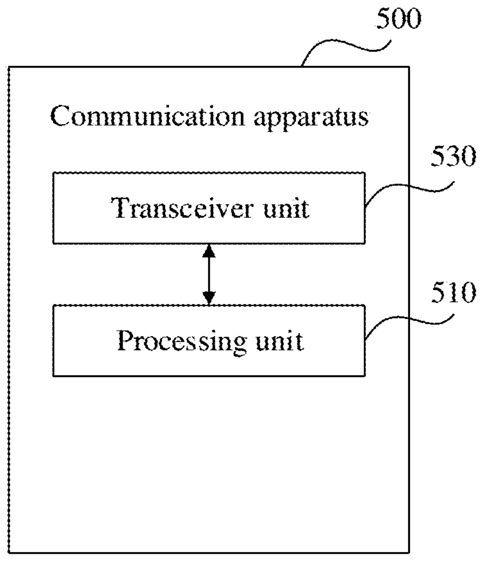
FIG. 5 is a schematic diagram of a structure of a communication apparatus according to an embodiment of this application.

FIG. 5 is a schematic diagram of a structure of a communication apparatus 500 in a communication method according to an embodiment of this application. The communication apparatus may be a terminal, a base station, a communication device, a network device, an apparatus having a function of a terminal or a base station, a chip, or the like in embodiments. Meanings or functions of the following terms or nouns may be understood with reference to the foregoing description, and details or implementations of the following steps or actions may also be understood with reference to the foregoing description. As shown in FIG. 5, the communication apparatus 500 may include a processing unit 510 and a transceiver unit 530. Alternatively, the transceiver unit in the communication device may include a receiving module and a sending module, and the receiving module and the sending module may be connected based on an antenna.

The transceiver unit 530 may be configured to support information receiving and sending between the communication device and the network device. Alternatively, the transceiver unit 530 may be configured to perform processing performed by the communication device or the network device in the communication method described in the foregoing embodiment.

In a possible design, the communication apparatus may be a terminal device or a chip configured in a terminal device. The following uses a first communication device or a second communication device as an execution body for description.

In a possible implementation, the first communication device obtains configuration information by using the processing unit 510 or the transceiver unit 530, where the configuration information includes configuration of a first resource pool and configuration of a second resource pool, the first resource pool is used to send first information, and the second resource pool is used to send second information. The first communication device obtains a transmission resource by using the processing unit 510 or the transceiver unit 530, where the transmission resource belongs to the first resource pool or the second resource pool.

When the transmission resource belongs to the first resource pool, the first communication device selects a first destination tunnel by using the processing unit 510, where the first destination tunnel is used to send the first information to a second communication device. When the transmission resource belongs to the second resource pool, the first communication device selects a second destination tunnel by using the processing unit 510, where the second destination tunnel is used to send the second information.

The first information is used by the first communication device to discover the second communication device, or is used for the first communication device to be discovered by the second communication device.

Based on the communication manner, flexible configuration of sidelink communication between terminals can be implemented, and system adaptation reliability can be improved.

Optionally, the first destination tunnel or the second destination tunnel has a destination identity, and the first communication device indicates a correspondence between the destination identity and the first information to the network device by using the transceiver unit 530. Therefore, the network device may obtain the correspondence for sidelink communication between terminals.

Optionally, the first communication device performs the following actions by using the transceiver unit 530:

- receiving downlink control information from the network device; and
- sending the first information on the transmission resource of the first resource pool based on the downlink control information in a first format; or sending the second information on the transmission resource of the second resource pool based on the downlink control information in a second format; or
- receiving downlink control information from the network device; and
- sending the first information on the transmission resource of the first resource pool or the second information on the transmission resource of the second resource pool based on the downlink control information in a third format; or sending the second information on the transmission resource of the second resource pool based on the downlink control information in a second format; or
- receiving downlink control information from the network device; and sending the first information on the transmission resource of the first resource pool or the second information on the transmission resource of the second resource pool based on the downlink control information in a second format. A total quantity of the first resource pools and the second resource pools is not greater than a preset value.

Therefore, the first communication device may determine, based on different formats of the downlink control information, an appropriate resource pool for information transmission. This improves flexibility of a communication system, and reduces design complexity.

Optionally, when the first information is in a to-be-transmitted state, the first communication device selects the transmission resource of the first resource pool based on the first information by using the processor 510. Similarly, when the normal information is in the to-be-transmitted state, the first communication device selects a transmission resource of a normal resource pool based on the normal information by using the processor 510. Different resource pools are used to transmit different information, so that communication quality and reliability can be improved for different scenarios, such as a discovery process or normal sidelink communication.

Optionally, the first communication device sends a request message to the network device by using the transceiver 530, to request to configure the transmission resource of the first resource pool for the first information. The first communication device receives a configured grant response from the network device by using the transceiver 530, where the response indicates the transmission resource of the first resource pool. Based on the request of the communication device, the network device may schedule a resource in real time, to ensure current communication. This implements accurate resource scheduling.

Optionally, the first communication device receives indication information from the network device by using the transceiver 530, to indicate that the first resource pool supports the first information and the second information, and the second resource pool supports information other than the first information. The communication device may learn, through the indication of the network device, use possibilities of different resource pools. This improves communication efficiency.

Optionally, when both the first information and the second information are in the to-be-transmitted state, the first communication device determines priorities of the first information and the second information by using the processor 510. When the priority of the first information is not lower than the priority of the second information, the first communication device sends the first information by using the transceiver 530 by using the transmission resource of the first resource pool. When the priority of the first information is higher than the priority of the second information, the first communication device sends the second information by using the transceiver 530 by using the transmission resource of the first resource pool. Higher-priority information is identified by determining a priority of information transmission, and it is ensured that the higher-priority information is preferentially transmitted, so that communication reliability can be ensured.

Optionally, the first communication device determines, by using the processor 510, that the transmission resource belongs to a first part or a second part of the first resource pool. When the transmission resource belongs to the first part of the first resource pool, the first communication device sends the first information by using the transceiver 530 by using the first part; or when the transmission resource belongs to the second part of the first resource pool, the first communication device sends the second information by using the transceiver 530 by using the second part. Resources in a resource pool are divided, so as to ensure that different resources are used for transmission of different information.

In another possible design, the communication apparatus may be a network device or a chip configured in a network device. The following uses the network device as an execution body for description.

In a possible implementation, the network device sends configuration information to a first communication device by using the transceiver 530, where the configuration information includes configuration of a first resource pool and configuration of a second resource pool, the first resource pool is used for first information, and the second resource pool is used for second information. The network device sends a transmission resource to the first communication device by using the transceiver 530, where the transmission resource belongs to the first resource pool or the second resource pool.

When the transmission resource belongs to the first resource pool, a first destination tunnel is used by the first communication device to send the first information to a second communication device; or when the transmission resource belongs to the second resource pool, a second destination tunnel is used by the first communication device to send the second information.

The first information is used by the first communication device to discover the second communication device, or is used for the first communication device to be discovered by the second communication device.

Optionally, the first destination tunnel or the second destination tunnel has a destination identity, and the network device receives a correspondence between the destination identity and the first information from the first communication device by using the transceiver 530.

Optionally, the network device performs the following action by using the transceiver 530:

- sending downlink control information to the first communication device, where
  - the downlink control information in a first format is used to schedule the first communication device to send the first information on the transmission resource of the first resource pool; or the downlink control information in a second format is used to schedule the first communication device to send the second information on the transmission resource of the second resource pool; or
- sending downlink control information to the first communication device, where
  - the downlink control information in a third format is used to schedule the first communication device to send the first information on the transmission resource of the first resource pool or send the second information on the transmission resource of the second resource pool; or the downlink control information in a second format is used to schedule the first communication device to send the second information on the transmission resource of the second resource pool; or
- sending downlink control information to the first communication device, where the downlink control information in a second format is used by the first communication device to send the first information on the transmission resource of the first resource pool or send the second information on the transmission resource of the second resource pool. A total quantity of the first resource pools and the second resource pools is not greater than a preset value.

Optionally, the network device receives a request message from the first communication device by using the transceiver 530, where the request message is used to request to configure the transmission resource of the first resource pool for the first information; and the network device sends a configured grant response to the first communication device, where the response indicates the transmission resource of the first resource pool.

Optionally, the network device sends indication information to the first communication device by using the transceiver 530, to indicate that the first resource pool supports the first information and the second information, and the second resource pool supports information other than the first information and the second information.

In this embodiment, the communications device or the network device is presented in a form of function modules or units obtained through division in an integrated manner. The "module" or "unit" herein may be an application-specific integrated circuit (ASIC), a circuit, a processor and a memory that execute one or more software programs or firmware programs, an integrated logic circuit, and/or another component that can provide the foregoing function. In a simple embodiment, a person skilled in the art may figure out that the apparatus 500 may be in a form shown in FIG. 4. For example, the function/implementation process of the transceiver unit 530 in FIG. 5 may be implemented by the processor 401 and the memory 403 in FIG. 4. Specifically, the application program code stored in the memory 403 may be invoked by the processor 401. This is not limited in embodiments of this application. Alternatively, optionally, the function/implementation process of the transceiver unit 530 in FIG. 5 may be implemented by the processor 401 in FIG. 4, or may be implemented by the communication interface 404 in FIG. 4. This is not limited in embodiments of this application. Specifically, the application program code stored in the memory 403 may be invoked by the processor 401. This is not limited in embodiments of this application.

Optionally, an embodiment of this application provides a chip system. The chip system includes a processor, configured to support a communication device implementing the foregoing communication method. In a possible design, the chip system further includes a memory. The memory is configured to store a program instruction and data that are necessary for the communication device. The chip system may include a chip, or may include a chip and another discrete device. This is not specifically limited in embodiments of this application.

The controller/processor configured to perform the base station, terminal, base station or terminal in the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present invention. The processor may be a combination of processors implementing a computing function, for example, a combination of one or more microprocessors, or a combination of the DSP and a microprocessor.

Methods or algorithm steps described in combination with the content disclosed in the present invention may be implemented by hardware, or may be implemented by a processor by executing a software instruction. The software instructions may include a corresponding software module.

The software module may be stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a terminal or a base station. Certainly, the processor and the storage medium may exist in a terminal or a base station as discrete components.

A person skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any usable medium accessible to a general-purpose or a dedicated computer.

In the foregoing embodiments of the present invention, the communication method provided in embodiments of the present invention is described from the perspective of each network element and the interaction between the network elements. It may be understood that each network element, such as the terminal or the communication apparatus, includes hardware structures and/or software modules for executing corresponding functions, to implement the foregoing functions. A person skilled in the art should easily be aware that, in combination with the units and algorithm steps in the examples described in embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

The objectives, technical solutions, and beneficial effect of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A method, comprising:

obtaining, by a first communication device, configuration information, wherein the configuration information comprises configuration of a first resource pool and configuration of a second resource pool, the first resource pool is configured to be used to send first information, and the second resource pool is configured to be used to send second information;

obtaining, by the first communication device, a transmission resource, wherein the transmission resource belongs to the first resource pool or the second resource pool; and performing a selection by:

selecting, by the first communication device, a first destination tunnel when the transmission resource belongs to the first resource pool, wherein the first destination tunnel is configured to be used to send the first information to a second communication device, and the first information is configured to be used by the first communication device to discover the second communication device, or to be used for the first communication device to be discovered by the second communication device; and selecting, by the first communication device, a second destination tunnel when the transmission resource belongs to the second resource pool, wherein the second destination tunnel is configured to be used to send the second information, wherein the second information is used for normal communication, and the normal communication is sidelink communication other than a discovery process.

2. The method according to claim 1, wherein obtaining, by the first communication device, the transmission resource comprises:

receiving, by the first communication device, downlink control information from a network device; and sending, by the first communication device based on the downlink control information, the first information on the transmission resource of the first resource pool or sending the second information on the transmission resource of the second resource pool, the downlink control information having a first format, and wherein:

a total quantity of the first resource pool and the second resource pool is not greater than a preset value.

3. The method according to claim 2, wherein the preset value is 8, and the downlink control information is 3 bits.

4. The method according to claim 3, wherein the 3 bits are used to uniformly number the first resource pool and the second resource pool.

5. The method according to claim 1, wherein obtaining, by the first communication device, the transmission resource comprises:

when the first information is in a to-be-transmitted state, selecting, by the first communication device, the transmission resource of the first resource pool based on the first information.

6. The method according to claim 1, further comprising:

receiving, by the first communication device, a discovery message from a terminal device, wherein the discovery message comprises cell access related information, and the cell access related information comprises at least one new radio cell global identity (NCGI); and reporting, by the first communication device, a measurement report to a network device, wherein the measurement report comprises all NCGIs comprised in the cell access related information.

7. A method, comprising:

sending, by a network device, configuration information to a first communication device, wherein the configuration information comprises configuration of a first resource pool and configuration of a second resource pool, the first resource pool is configured to be used for transmission of first information, and the second resource pool is configured to be used for transmission of second information; and sending, by the network device, a transmission resource to the first communication device, wherein the transmission resource belongs to the first resource pool or the second resource pool, and wherein:

when the transmission resource belongs to the first resource pool, a first destination tunnel is used by the first communication device to send the first information to a second communication device, wherein the first information is used by the first communication device to discover the second communication device, or is used for the first communication device to be discovered by the second communication device; and when the transmission resource belongs to the second resource pool, a second destination tunnel is used by the first communication device to send the second information, wherein the second information is used for normal communication, and the normal communication is sidelink communication other than a discovery process.

8. The method according to claim 7, wherein sending, by the network device, the transmission resource to the first communication device comprises:

sending, by the network device, downlink control information to the first communication device, wherein the downlink control information has a first format, and the downlink control information is used by the first communication device to send the first information on the transmission resource of the first resource pool or send the second information on the transmission resource of the second resource pool; and a total quantity of the first resource pool and the second resource pool is not greater than a preset value.

9. The method according to claim 8, wherein the preset value is 8, and the downlink control information is 3 bits.

10. The method according to claim 9, wherein the 3 bits are used to uniformly number the first resource pool and the second resource pool.

11. An apparatus, comprising:

at least one processor; and at least one memory coupled to the at least one processor and configured to store executable instructions for execution by the at least one processor to instruct the at least one processor to:

obtain configuration information, wherein the configuration information comprises configuration of a first resource pool and configuration of a second resource pool, the first resource pool is configured to be used to send first information, and the second resource pool is configured to be used to send second information;

obtain a transmission resource, wherein the transmission resource belongs to the first resource pool or the second resource pool; and perform a selection by:

select a first destination tunnel when the transmission resource belongs to the first resource pool, wherein the first destination tunnel is configured to be used to send the first information to a second communication device, and the first information is configured to be used to discover the second communication device, or to be used for the apparatus to be discovered by the second communication device; and select a second destination tunnel when the transmission resource belongs to the second resource pool, wherein the second destination tunnel is configured to be used to send the second information, wherein the second information is configured to be used for normal communication, and the normal communication is sidelink communication other than a discovery process.

12. The apparatus according to claim 11, wherein the executable instructions further instruct the at least one processor to:

receive downlink control information from a network device; and send, based on the downlink control information, the first information on the transmission resource of the first resource pool or send the second information on the transmission resource of the second resource pool, wherein the downlink control information has a first format, and wherein:

a total quantity of the first resource pool and the second resource pool is not greater than a preset value.

13. The apparatus according to claim 12, wherein the preset value is 8, and the downlink control information is 3 bits.

14. The apparatus according to claim 13, wherein the 3 bits are used to uniformly number the first resource pool and the second resource pool.

15. The apparatus according to claim 11, wherein the executable instructions further instruct the at least one processor to:

when the first information is in a to-be-transmitted state, select the transmission resource of the first resource pool based on the first information.

16. The apparatus according to claim 11, wherein the executable instructions further instruct the at least one processor to:

receive a discovery message from a terminal device, wherein the discovery message comprises cell access related information, and the cell access related information comprises at least one new radio cell global identity (NCGI); and report a measurement report to a network device, wherein the measurement report comprises all NCGIs comprised in the cell access related information.

17. An apparatus, comprising:

at least one processor; and at least one memory coupled to the at least one processor and configured to store executable instructions for execution by the at least one processor to instruct the at least one processor to:

send configuration information to a first communication device, wherein the configuration information comprises configuration of a first resource pool and configuration of a second resource pool, the first resource pool is configured to be used for transmission of first information, and the second resource pool is configured to be used for transmission of second information; and send a transmission resource to the first communication device, wherein the transmission resource belongs to the first resource pool or the second resource pool, and wherein:

when the transmission resource belongs to the first resource pool, a first destination tunnel is used by the first communication device to send the first information to a second communication device, wherein the first information is used by the first communication device to discover the second communication device, or is used for the first communication device to be discovered by the second communication device; and when the transmission resource belongs to the second resource pool, a second destination tunnel is used by the first communication device to send the second information, wherein the second information is used for normal communication, and the normal communication is sidelink communication other than a discovery process.

18. The apparatus according to claim 17, wherein the executable instructions further instruct the at least one processor to:

send downlink control information to the first communication device, wherein:

the downlink control information has a first format and is used by the first communication device to send the first information on the transmission resource of the first resource pool or send the second information on the transmission resource of the second resource pool; and a total quantity of the first resource pool and the second resource pool is not greater than a preset value.

19. The apparatus according to claim 18, wherein the preset value is 8, and the downlink control information is 3 bits.

20. The apparatus according to claim 19, wherein the 3 bits are used to uniformly number the first resource pool and the second resource pool.

* * * * *